United States Patent
Sakamoto et al.

(10) Patent No.: US 11,030,286 B2
(45) Date of Patent: *Jun. 8, 2021

(54) AUTHENTICATION APPARATUS, METHOD, SYSTEM AND PROGRAM, AND SERVER APPARATUS

(71) Applicants: NEC Corporation, Tokyo (JP); The University of Tokyo, Tokyo (JP)

(72) Inventors: Shizuo Sakamoto, Tokyo (JP); Rie Yamaguchi, Tokyo (JP); Hiroya Susuki, Tokyo (JP)

(73) Assignees: NEC CORPORATION, Tokyo (JP); THE UNIVERSITY OF TOKYO, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/750,267

(22) Filed: Jan. 23, 2020

(65) Prior Publication Data

US 2020/0159893 A1 May 21, 2020

Related U.S. Application Data

(63) Continuation of application No. 15/543,263, filed as application No. PCT/JP2016/051268 on Jan. 18, 2016, now Pat. No. 10,579,781.

(30) Foreign Application Priority Data

Jan. 19, 2015 (JP) .................................. 2015-008162

(51) Int. Cl.
*G06F 21/00* (2013.01)
*G06F 21/31* (2013.01)
(Continued)

(52) U.S. Cl.
CPC .............. *G06F 21/31* (2013.01); *G06F 21/12* (2013.01); *H04L 9/3226* (2013.01);
(Continued)

(58) Field of Classification Search
CPC ..... G06F 21/12; G06F 21/31; H04L 2209/80; H04L 2463/082; H04L 63/08;
(Continued)

(56) References Cited

U.S. PATENT DOCUMENTS 10,440,016 B2 * 10/2019 Oberheide .......... H04L 63/0861
2011/0238612 A1   9/2011 Wilson
(Continued)

FOREIGN PATENT DOCUMENTS

CN    102904885 A    1/2013
EP    2083399 A1    7/2009
(Continued)

OTHER PUBLICATIONS

Symantec Inc./Japan VeriSign Co., Ltd., Awareness survey results on "Personal and corporate password management" report, Oct. 2013; (41 pages total) URL:https://www.jp.websecurity.symantec.com/welcome/pdf/password_management_survey.pdf (Cited in Specification).

(Continued)

*Primary Examiner* — Joseph P Hirl
*Assistant Examiner* — Ka Shan Choy (57) ABSTRACT

A scenario including a combination of procedures of multi-factor authentication required for a terminal to receive provision of a service is stored and managed in association with the service, and a probability that the procedure will succeed is stored and managed in association with each of the procedures, a success probability of the service through the scenario, is calculated based on the probability regarding the procedure to evaluate at least one of security and (Continued)

| Service | Cost | Security parameter | Usability parameter |
|---------|------|--------------------|---------------------|
| $srvc_1$ | $cost_1$ | $k_1$ | $ub_1$ |
| $srvc_2$ | $cost_2$ | $k_2$ | $ub_2$ |
| $srvc_3$ | $cost_3$ | $k_3$ | $ub_3$ |
| . | . | . | . |
| . | . | . | . |
| . | . | . | . | usability based on the success probability, and the service to the terminal, is controlled according to the evaluation result.

4 Claims, 6 Drawing Sheets (51) Int. Cl.
H04L 29/06       (2006.01)
G06F 21/12       (2013.01)
H04L 9/32        (2006.01)
H04W 12/06       (2021.01)

(52) U.S. Cl.
CPC ............ H04L 9/3231 (2013.01); H04L 63/08 (2013.01); H04L 63/083 (2013.01); H04L 63/1425 (2013.01); H04L 63/205 (2013.01); H04W 12/068 (2021.01); *H04L 2209/80* (2013.01); *H04L 2463/082* (2013.01)

(58) Field of Classification Search
CPC . H04L 63/083; H04L 63/1425; H04L 63/205; H04L 9/3226; H04L 9/3231; H04W 12/0608; H04W 12/06
See application file for complete search history.

(56) References Cited

U.S. PATENT DOCUMENTS

| | | | |
|---|---|---|---|
| 2012/0054834 | A1 | 3/2012 | King |
| 2013/0055346 | A1 | 2/2013 | Singh et al. |
| 2013/0167196 | A1* | 6/2013 | Spencer ............. H04L 61/6022 726/3 |
| 2014/0282866 | A1* | 9/2014 | Jakobsson ............... H04L 63/08 726/3 |
| 2015/0363582 | A1 | 12/2015 | Sheller et al. |

FOREIGN PATENT DOCUMENTS

| | | |
|---|---|---|
| JP | 2008-250446 A | 10/2008 |
| JP | 2009-175984 A | 8/2009 |

OTHER PUBLICATIONS

Survey on actual status of IPA, online identity authentication method. Aug. 15, 2014; (119 pages total) URL: https://www.ipa.go.jp/files/000040778.pdf (Cited in Specification).

Japan Post Bank, About Risk Based Certification (Image and Concluding). (5 pages total) (Dec. 15, 2014 search) URL: http://www.jp-bank.japanpost.jp/direct/pc/security/drsecurity/dr_pc_sc_ds_riskbase.html (Cited in Specification).

Google. Last Account Activity. (5 pages total) (Dec. 15, 2014 search) Internet; URL:https://support.google.com/mail/answer/45938?hl=ja> (Cited in Specification).

Cabinet Secretariat, Risk Assessment and Electronic Signature/Authentication Guidelines in Online Proceedings, Aug. 31, 2010, (52 pages total) URL:https://www.kantei.go.jp/jp/singi/it2/guide/guide_line/guideline100831.pdf (Cited in Specification).

Isoo Ueno et al., "An Evaluation Method of Combined Authentication Techniques Including Biometric Authentication Techniques", IEICE Technical Report, Jan. 13, 2011, vol. 110, No. 372, pp. 1 to 6. (Cited in ISR).

International Search Report for PCT Application No. PCT/JP2016/051268, dated Apr. 5, 2016.

Japanese Office Action for JP Application No. 2016-570624 dated Aug. 21, 2018 with English Translation.

* cited by examiner

| Input device | Sensor | Externally connected | Output | Secure Elements |
|---|---|---|---|---|
| Touch panel keyboard | Gyro sensor | Mobile phone network | Display | Carrier SIM |
| Microphone | GPS sensor | Bluetooth | Speaker | TMP |
| Button | Thermometer, hygrometer | NFC | Light | Felica |
| Camera | Light sensor | WiFi | Vibration | Software SIM |
| Fingerprint sensor | Geiger counter | USB | Main body Memory | Cloud SIM |
| | | CTIA | SD card | |

FIG. 3B

| Procedure | Login client | Whose ID is used for Login | Success/Failure | Probability |
|---|---|---|---|---|
| $f^+(u)$ | u | U | 1 | $p(f^+(u)|u)$ |
| $f^-(u)$ | u | U | 0 | $p(f^-(u)|u)$ |
| $f^+(a)$ | a | U | 1 | $p(f^+(u)|a)$ |
| $f^-(a)$ | a | U | 0 | $p(f^-(u)|a)$ |

FIG. 4A

| Service | Cost | Security parameter | Usability parameter |
|---|---|---|---|
| $srvc_1$ | $cost_1$ | $k_1$ | $ub_1$ |
| $srvc_2$ | $cost_2$ | $k_2$ | $ub_2$ |
| $srvc_3$ | $cost_3$ | $k_3$ | $ub_3$ |
| . | . | . | . |
| . | . | . | . |
| . | . | . | . |

FIG. 4B

| Scenario | Success rate of attack | Fail rate of User |
|---|---|---|
| $S_1$ | $p(S^+_1(u_i) \mid a)$ | $p(S^+_1(u_i) \mid u_i)$ |
| $S_2$ | $p(S^+_2(u_i) \mid a)$ | $p(S^+_2(u_i) \mid u_i)$ |
| . | . | . |
| . | . | . |
| . | . | . |
| $S_n$ | $p(S^+_n(u_i) \mid a)$ | $p(S^+_n(u_i) \mid u_i)$ |

Service 1

| | $p(\tilde{S}(u)|a)$ | $p(\tilde{S}(u)|u)$ |
|---|---|---|
| Scenario SA1 | × | × |
| Scenario SA2 | ○ | ○ |
| Scenario SA3 | × | × |
| Scenario SA4 | × | ○ |
| Scenario SA5 | ○ | × |

Secure parameters : k1
Usability parameters : ub1

FIG. 6B

Service 2

| | $p(\tilde{S}(u)|a)$ | $p(\tilde{S}(u)|u)$ |
|---|---|---|
| Scenario SB1 | × | × |
| Scenario SB2 | ○ | ○ |
| Scenario SB3 | ○ | ○ |
| Scenario SB4 | × | × |

Secure parameters : k2
Usability parameters : ub2

AUTHENTICATION APPARATUS, METHOD, SYSTEM AND PROGRAM, AND SERVER APPARATUS

REFERENCE TO RELATED APPLICATION

The present application is a Continuation application of Ser. No. 15/543,263 filed on Jul. 13, 2017, which is a National Stage Entry of PCT/JP2016/051268 filed on Jan. 18, 2016, which claims priority from Japanese Patent Application 2015-008162 filed on Jan. 19, 2015, the contents of all of which are incorporated herein by reference, in their entirety.

TECHNICAL FIELD

The present invention relates to an authentication apparatus, a method, a system, a program, and a server apparatus.

BACKGROUND ART

With wide spread use of high-function mobile terminals such as smartphones, it has become possible to implement multi-factor authentication (Multi-Factor Authentication) more safely and realistically, by using multiple sensors and constant updates of applications on the terminal. In cloud services that provide authentication services for improving security when using smart devices such as smart phones and tablet PCs (Personal Computers), for example, two-factor authentication using software certificates is adopted. In this case, for example, by inputting ID (Identity: identification information)/password from a smart device, an authorized device and user are identified to allow the user to access, for example, to a business application, etc., from the smart device.

Although various techniques of multi-factor authentication have been proposed, the reality is that an evaluation axis for each authentication accuracy has not yet been provided.

ID and password are used in most sites for authentication in a login procedure of EC (Electronic Commerce: electronic commerce) site (see Non-Patent Literature 1, for example). However, authentication with ID and password alone is said to have security problems. As is indicated by frequent occurrence of an attack called a password list attack, for example, it has become impossible to sufficiently secure security in login authentication with ID and password alone (see, for example, Non-Patent Literature 2).

Such smart devices with a plurality of sensors and secure elements mounted in advance are manufactured and sold. In particular, a terminal with a biometric authentication function implemented and payment using terminal authentication using a secure element of SIM (Subscriber Identity Module) have begun to be used. That is, although ID and password are based on user's memory and input, authentication not depending on user's memory and input alone is beginning to be used.

In addition, a possibility of a behavior based authentication method has been spreading, such as pointing out possibility of fraud when logging in with an IP(Internet Protocol) different from a usually used access source, a method of examining likeliness of true self by utilizing history of past shopping and Web browsing, etc. For example, a mechanism has been proposed in which, when a user who usually logs in Japan logs in overseas, an alert of a password is issued (for example, see Non-Patent Literature 4).

Non-Patent Literature 1:
Symantec Inc./Japan VeriSign Co., Ltd., Awareness survey results on "Personal and corporate password management" report, 2013.10, [Dec. 15, 2014 search], Internet <URL: https://www.jp.websecurity.symantec.com/welcome/pdf/password_management_survey.pdf>

Non-Patent Literature 2:
Survey on actual status of IPA, online identity authentication method, 2014.8, [Dec. 15, 2014 search], Internet <URL:/https://www.ipa.go.jp/files/000040778.pdf>

Non-Patent Literature 3:
Japan Post Bank, About Risk Based Certification (Image and Concluding), [Dec. 15, 2014 search], Internet <URL: http://www.jp-bank.japanpost.jp/direct/pc/security/drsecurity/dr_pc_sc_ds_riskbase.html>

Non-Patent Literature 4:
Google, Last Account Activity, [Dec. 15, 2014 search], Internet <URL: https://support.google.com/mail/answer/45938?hl=ja>

Non-Patent Literature 5:
Cabinet Secretariat, Risk Assessment and Electronic Signature/Authentication Guidelines in Online Proceedings, 2010.8, [Dec. 15, 2014 search], Internet <URL: http://www.kantei.go.jp/jp/singi/it2/guide/guide_line/guideline100831.pdf>

SUMMARY

The following analysis has been made based on the present invention.

Many of authentication schemes determine success/failure of authentication by one authentication element. Multi-factor authentication combining a plurality of authentication elements also utilizes pre-set elements, such as ID/password, and presentation of a random number table, for example.

As with risk-based authentication, a service which does not always issue an authentication request in the same format, is also increasing, wherein an authentication element is added only when a behavior of a user is "different from ordinary" (for example, refer to Non-Patent Literature 3). In a risk-based authentication, for example, when an access is made with user information or the like, the same as usual, for example, authentication with a fixed password, etc., is performed, and when access is made with user information, etc., different from user, assuming that a risk is high that the user information such as password is stolen, additional certification such as letting the user answer an additional question(s) registered in advance is carried out.

In recent years, particularly with widespread use of high-function terminals of smartphones, it can be said that environments enabling frequent change of procedures are also being in place by introducing new applications and utilizing various types of sensors mounted on the terminals.

In this way, an evaluation scheme for entire authentication is required in order to dynamically change and use a combination of various and variable authentication elements. Further, in this evaluation scheme, a flexible and highly convenient scheme is desired, which makes it possible to change to another authentication scheme, when the authentication service actually is started, for example.

The present invention has been invented in view of the above problems, and an object thereof is to provide an apparatus, a method, a system, a program, and a server apparatus that allow a combination of authentication elements to be dynamically changed and made available.

According to one aspect of the present invention, there is provided a multi-factor authentication apparatus communicatively connecting to a terminal to perform multi-factor authentication, comprising:

a storage unit that stores a scenario including a combination of procedures of multi-factor authentication required for the terminal to receive provision of a service in association with the service, and stores, in association with each of the procedures, a probability that the procedure will succeed;

an evaluation means (evaluation unit) that calculates a success probability of the service through the scenario based on the probability regarding the procedure to evaluate at least one of security and usability based on the success probability; and a control means (control unit) that controls the service to the terminal, according to the evaluation result.

According to the present invention, there is provided an authentication system comprising: a terminal and the multi-element authentication apparatus.

According to another aspect of the present invention, there is provided a server apparatus including the multi-element authentication apparatus.

According to yet another aspect of the present invention, there is provided a method for performing multi-factor authentication by a computer communicatively connecting to a terminal, the method comprising:

storing in a storage unit a scenario including a combination of procedures of multi-factor authentication required for a terminal to receive provision of a service in association with the service, and storing in the storage unit, in association with each of the procedures, a probability that the procedure will succeed;

calculating a success probability of the service through the scenario based on the probability regarding the procedure, to evaluate at least one of security and usability based on the success probability; and controlling the service to the terminal, according to the evaluation result.

According to still another aspect of the present invention, there is provided a program for causing a computer communicatively connecting to a terminal to perform multi-factor authentication to execute processing comprising:

storing in a storage unit a scenario including a combination of procedures of multi-factor authentication required for a terminal to receive provision of a service in association with the service, and storing in the storage unit, in association with each of the procedures, a probability that the procedure will succeed;

calculating a success probability of the service through the scenario based on the probability regarding the procedure, to evaluate at least one of security and usability based on the success probability; and controlling the service to the terminal, according to the evaluation result.

According to the present invention, there is provided a non-transitory computer readable recording medium (a semiconductor memory, a magnetic/optical/recording medium, etc.) in which the above program is recorded.

The present invention makes it possible to dynamically change and use a combination of authentication. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

The following describes at first an outline of the present invention and then embodiments.

In the below, (A) Necessity for considering a plurality of scenarios regarding available means for performing multi-factor authentication in a smartphone or the like, will be described.

(B) When there are multiple scenarios for providing services, security evaluation using respective probabilistic models is necessary. Therefore, update of security evaluation will also be described.

(C) Further, how to select the scenario in the actual service, etc., by performing not only evaluation of security, but also evaluation of user's convenience in the same way, and continuing to update results of the both evaluations, will be described.

Examples of functions on smartphones will be listed and analysis about a fact that multi-factor authentication combining multiple elements is practically applicable as authentication means. Further, what kind of model is good as a framework for security evaluation of multi-factor authentication. The following describes how to utilize this model.

A smartphone has an Internet connection function, wherein an application installed on the smartphone is able to provide various services by utilizing the Internet function. Many of services provided via the Internet require authentication, and there is a need to verify "identity" of a user. There is a secure element as an effective authentication means for ascertaining "identity". In addition, means for inputting information depending on user's memory and a plurality of sensors are incorporated in the smartphone. The following gives listing examples of functions of smartphones and investigation on what authentication scenarios in future can be conceived in smartphones.

Functions of a smartphone configured to be able to interact with a user will be described. Here, a plurality of functions are enumerated, but there is a case where each function is not limited only to input or the like. The description is given mainly regarding to which one (input/output) the function is used.

Figure 3A:
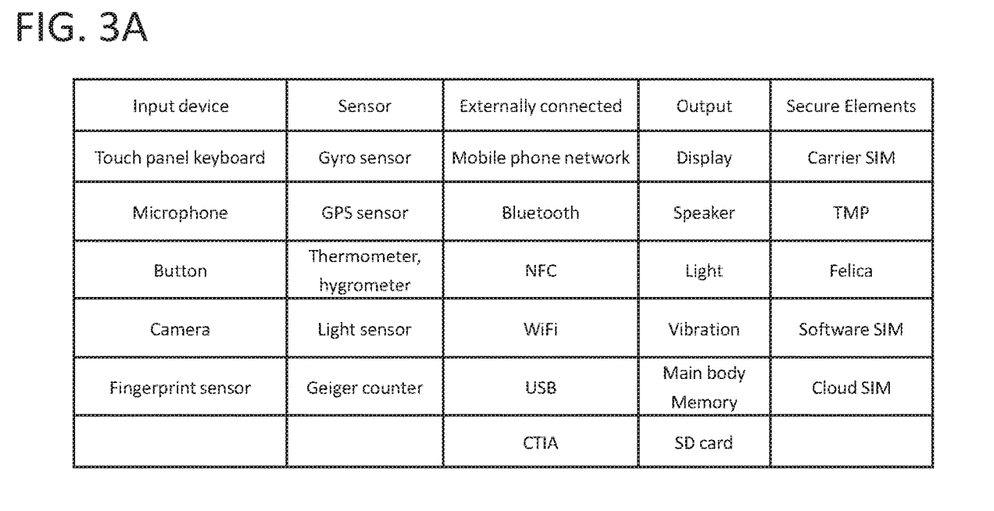
FIG. 3A is a diagram illustrating a smartphone function in a tabular form.

When a user performs some operation on a smartphone, the user informs a request to the smartphone through an input appliance of the smartphone. Possible inputs on commercially available devices are as shown in the "input devices" column of FIG. 3A. Although not particularly limited thereto, in the smartphone of this example, there are provided a touch panel, a microphone, a button, a camera, a fingerprint sensor, and the like, as input devices.

Among the sensors, a gyro sensor (acceleration sensor) detects a motion (gesture) taken by a user holding a smartphone. A GPS (Global Positioning System) sensor detects a position of a smartphone. An optical sensor detects ambient light (illuminance), for example. A Geiger counter is, for example, a radiation detector of a smartphone connected type. As objects externally connected by the smartphone connects, there are a mobile phone network, Bluetooth (registered trademark of Bluetooth SIG, Inc), NFC (Near Field Communication), Wireless Fidelity (WiFi: WiFi Alliance USB (Universal Serial Bus), CTIA (Cellular Telephone Industries Association), and the like. Outputs include a display apparatus, a speaker, a light, and vibration by a vibrator, a memory, a SD card, and so forth, of a smartphone. Secure element is a secure area for managing confidential information. There are provided Carrier SIM, TPM (Trusted Platform Module), Felica (registered trademark of Sony Corporation), software SIM, cloud SIM, and the like.

Even with a tamper resistant apparatus, there may be a danger that safety will be threatened by multiple attacks. Accordingly, there is a need to consider safety in a certain time axis.

There are such smartphones that have already been used as standalone authentication, and those that have already been realized as multi-factor authentication by combining multiple authentications. Each procedure is realized by combining elements with each of the functions of the smartphone as an element.

Figure 1:
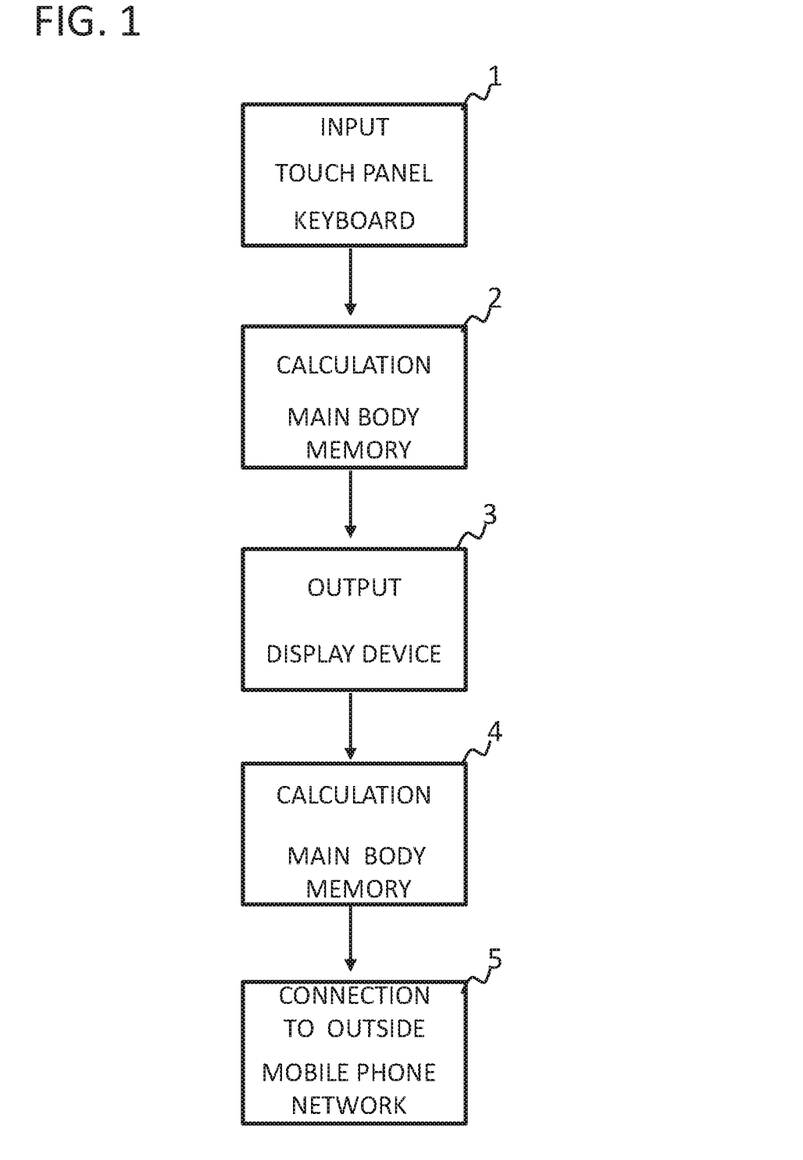
FIG. 1 is a diagram illustrating an example of elements in multi-factor authentication.

For example, when inputting an ID and inputting a password, a procedure of ID-password authentication is realized by combining functions of the smartphone, as illustrated in FIG. 1. By combining such procedures, for example, the following multi-factor authentication can be realized.

Activate a corresponding function in SIM by biometric authentication, login (input of fingerprint, voice, input pattern etc);

Activate a corresponding function by a wearable terminal, login using a terminal ID; and Activate a corresponding function by a contactless card, login using terminal ID.

In this way, multi-factor authentication with a combination of a plurality of elements (functions) has become feasible. However, multi-factor authentication is limited to restricted use in a system based on use of dedicated tokens (for example, a one token generated by a hardware or the like) or use of a random number table given in advance. Therefore, it is not necessary to provide a unified evaluation axis of multiple elements. Regarding load on a system and user, especially usability, comparison with and analysis of security have not yet been performed.

For example, a smartphone equipped with functions applicable to multi-factor authentication, on which are mounted such as a plurality of sensors and a secure element(s), are being used. Since a framework that enables frequent updating (update) of an application is also systemized, flexible modification of elements is also necessary. On the other hand, it is difficult to stop providing services started. Therefore, a viewpoint of continuity must also be considered.

Thus, there is a need for a framework for dynamically evaluating the safety of multi-factor authentication towards realizing a unified, flexible, and sustainable service.

According to the present invention, evaluation criteria (evaluation axis) of multi-factor authentication is configured by using a probabilistic model of security and usability for each scenario so that continuous service can be provided, for example, changes in security environment etc. We propose a framework to dynamically change the corresponding authentication method.

In the following, the multi-factor authentication according to the present invention will be described in more detail.
<Authentication>

"Authentication" means verification of the identity between the "executing entity" of a certain act and the "registration information" performed by the subject in the state via the network, whereby the person whose execution subject is registered (Or apparatus) (see Non-Patent Literature 5, for example).

Hereinafter, the execution subject of an action is assumed to be the user u∈U. Here, U represents a set of the entire user. In a scene where authentication is required, when a user receives a certain service srvc, the service provider confirms the authority as to whether or not there is authorization to receive the service in a certain transaction tra.

Assuming as a scene where confirmation of authority is required is not necessary for services that can be done to anyone. On the other hand, authentication is required for services that only authorized persons can receive. It is assumed that the authorized user u is receiving the service srvc with an intention.

In addition, the transaction tra is performed via online. As an online service, for example, a site intended for communication such as a Web shopping site or an EC (Electronic Commerce) site such as an auction, SNS (Social Networking Service) is assumed. In these sites, when the user u intends to use the user u, the user u asks the provision of the service (at the time of system registration, etc., it is not a service that the user u does not continuously access by only setting once). For this reason, the system frequently asks the user u seeking to provide the service, for authentication. When receiving such a service, the user does not directly connect to the network, but connects to the Internet via a terminal (smartphone, PC) etc. possessed by the user or the like. It is noted that in the description below, a user u is supposed to receive a service even when the service is provided to a terminal or the like.

In biometric authentication, in spite of a fact that a user u tries to input correct biometric information, the information may not be correctly acquired, for example, because the user fails to ground the fingerprint at the time of input, for example. Further, erroneous detection may occur in which the input is recognized as one of an input user u of a person different from the user u. In the below, it is assumed that an authentication result of each element is uniquely determined in biometrics authentication, and is detected in a case where later tracking is possible as to whether the value is correct or incorrect.

First, when receiving a certain service srvc, a user u logs in by using plural elements such user's memory of ID and password, utilization of a random number table, etc. Existence of an attacker α∈A trying to impersonate the user u (A is a set of attackers) is supposed.

When the user u receives a certain service, multi-factor authentication is performed. In a case where there are provided a plurality of authentication elements (touch panel, sensor, etc.), as in the case of a smartphone, etc., selection and combination of authentication elements are supposed to be different for each service.

Depending on a service, a combination of a plurality of authentication elements may be selected.

<Scenario>

Such a combination of authentication elements is called a "scenario".

<Procedure (Factor)>

$$S'=((f_1),(f_2),\ldots(f_n))(n\in N)$$

In a combination of authentication elements, it is assumed that it is possible to arrange a plurality of procedures (factors) $f\in F$ (F is a set of procedures) of the scenario S in a predetermined order (the following expression (1)). Here, the procedure (factor) $f\in F$ refers to an authentication element based on storage such as ID and password or fingerprint authentication.

<Scenario and Procedure>

$$S=((f_1,1),(f_2,2),\ldots(f_n,n))(n\in N) \quad (1)$$

The scenario can be represented without setting an order of procedure f. In that case, the scenario shall be given by the following equation (2).

$$S'=((f_1),(f_2),\ldots(f_n))(n\in N) \quad (2)$$

<Element>

Each procedure is composed of a plurality of elements $e\in E$ (E is a set of elements).

Here, an element is an action necessary for each procedure f.

<Procedures and Elements>

Procedure f is composed of one or a plurality of elements as shown in the following expression (3), for example.

$$f=((e_1,1)(e_2,2),\ldots,(e_n,n))(n\in N) \quad (3)$$

For example, suppose that a scenario S such as a combination of ID, password and fingerprint authentication is selected. The scenario S is represented by the following equation (4), for example.

$$S=((f_1,1),(f_2,2))=(((e_1,1),\ldots),((e_2,1),\ldots)) \quad (4)$$

Here, S consists of ID password authentication and fingerprint authentication. $f_1$ is an ID password authentication element, and $f_2$ is a fingerprint authentication element.

Each one such as $(e_1, 1)$, $(e_2, 1)$ is an element as illustrated in FIG. 1 (input, calculation, etc.)

As each authentication result, each f returns 1 if it is determined that the authentication is correct, and 0 if the authentication is not correct, it returns binary (0, 1) of 0.

In providing the service to the user u, the scenario S which is a combination of authentication elements is not always one. Combination of multiple scenarios is also possible because it is possible to select multiple authentication elements. That is, there are a plurality of scenarios, selection thereof being enabled. Thus, when one scenario (a combination of certain authentication elements) cannot be used for the user u, it is possible to select another scenario (another combination of authentication elements). Thus, it is made possible to provide continuous service provision to the user u.

The following describes how respective elements become related in conducting multi-factor authentication. Two patterns of scenarios, serial and parallel, can be considered in multi-factor authentication.

<Series Procedure>

Authentication progresses step by step. For example, asking for input from the random number table after asking for ID and password input is a serial procedure.

Figure 2A:
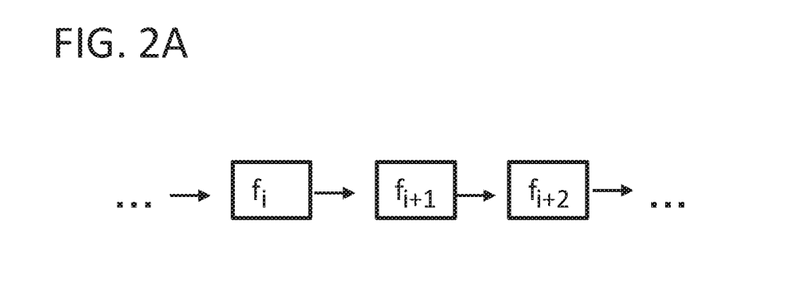
FIGS. 2A to 2D are diagrams illustrating a serial procedure, a parallel procedure, and combinations thereof.

As shown in FIG. 2A, after performing a certain procedure $f_1$, a request for $f_2$ as a next procedure is performed, and then a procedure $f_3$ is performed, there is a case where each of authentications is connected in multiple stages. This procedure is called a serial procedure. In this case, a scenario S is expressed by the following equation (5).

$$S=((f_1,1),(f_2,2),\ldots(f_n,n))(n\in N) \quad (5)$$

In the equation (5), the order of the procedures $(f_1, 1),(f_2, 2),\ldots(f_n, n)$ has a meaning as a multi-level authentication order.

<Parallel Procedure>

Figure 2B:
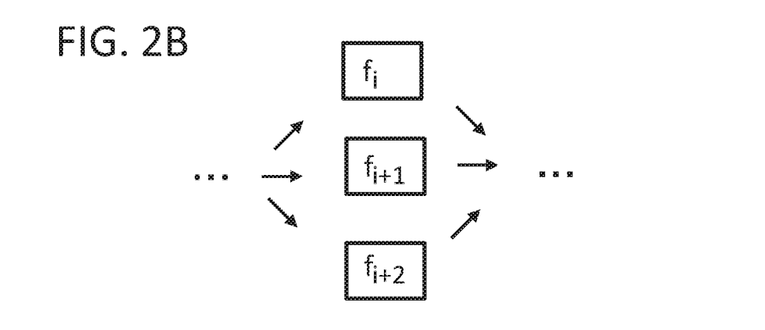

Authentication performs evaluation in parallel. For example, such a case where ID of a SIM card of a smartphone is confirmed in parallel with input of user's ID and password. For example, as shown in FIG. 2B, confirming a procedure $f_{i+1}$ and another procedure $f_{i+2}$ in parallel is termed as "parallel procedure". In this case, the scenario S is expressed by the following equation (6).

$$S=((f_1,1),(f_2,2),\ldots(f_n,n))(n\in N) \quad (6)$$

In the equation (6), an order of procedures $(f_1, 1),(f_2, 2),\ldots(f_n, n)$ has no meaning. Therefore, the equation (6) is denoted by the following equation (7).

$$S'=((f_1),(f_2),\ldots(f_n))(n\in N) \quad (7)$$

Figure 2C:
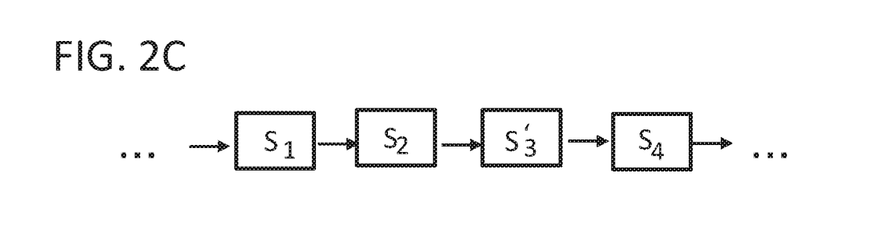
Figure 2D:
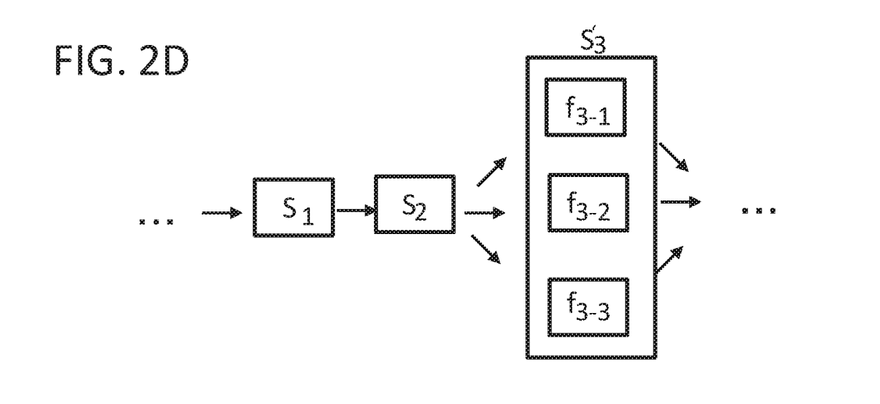

There is a case where a system may be configured by combining a serial procedure and a parallel procedure. FIG. 2C illustrates a combination of serial procedure scenarios S1, S2, and S4 and parallel procedure scenario S3' in series. FIG. 2D is a diagram in which the scenario S3' of the parallel procedure is expanded and represented by the following expression (8).

$$S_{all} = (S_1, S_2, S'_3, S_4) \quad (8)$$
$$= (S_1, S_2, (f_{3\text{-}1}, f_{3\text{-}2}, f_{3\text{-}3}), S_4)$$

Next, serial authentication and probability of success in the present embodiment will be described.

<Probability of Success Per Procedure>

Figure 3B:
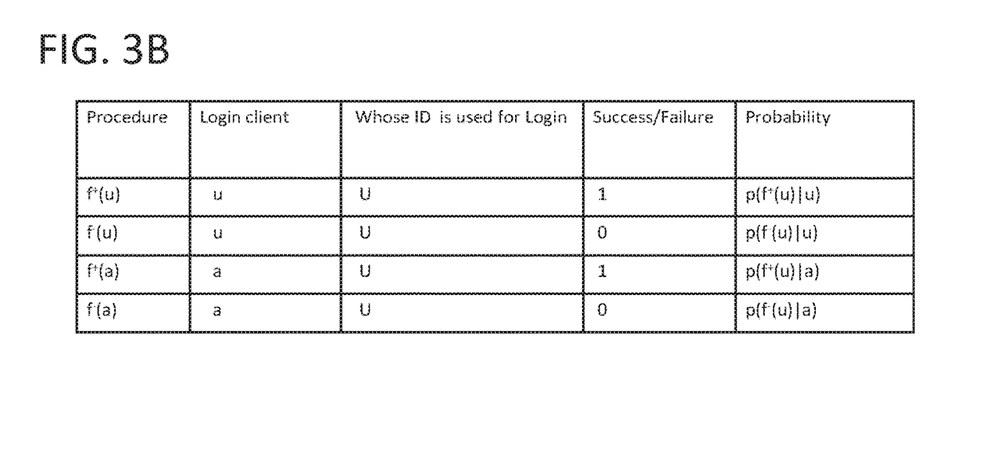
FIG. 3B is a diagram illustrating a relation between procedures and probabilities in a table format.

The probability of success for each procedure will be described using FIG. 3B. An authentication procedure is assumed to be $f\in F$, wherein the procedure f returns 1 if it succeeds and 0 if it fails.

When using the procedure f, performing the procedure with ID of a user u, is denoted as f (u). The procedure which returns 1 is denoted as $f^+$, and the procedure which returns 0 is denoted as $f^-$.

Let $f^+(u)$ be a procedure in which a user u performs a procedure f using ID of u, and which returns 1, and let a probability thereof be $p(f^+(u)|u)$.

Let a probability that an attacker a trying to succeed by impersonating u will succeed be $p(f^+(u)|a)$.

Next, let a probability of failure in a case wherein u fails the procedure f, be $p(f^-(u)|u)$. The following equations (9) and (10) hold (see FIG. 3B).

$$p(f^+(u)|u)+p(f^-(u)|u)=1 \quad (9)$$

$$p(f^+(u)|a)+p(f^-(u)|a)=1 \quad (10)$$

When a scenario S contains only one procedure f, the probability p(f⁺(u)|u) is a probability of success for S.

When using knowledge, the probability of success may be 100% for a period of time. This is because, inherently, an application such as a browser memorizes contents (password corresponding to ID) that a user u should memorize, so that the application may play a role of user's memory.

In this case, the user cannot fail and hence the probability p(f⁺(u)|u) is, always, p=1, that is, succeeds.

On the other hand, in a case of biometric authentication, since fluctuation or the like occurs at a time of input of biometric information of a user, a success probability cannot be 1. That is, the success probability can only be p<1.

<Probability of Multi-Factor Authentication Per Scenario>

It is assumed that a user u selects a scenario S as a combination of authentication elements and performs a plurality of procedures $f_1$ to $f_n$.

$$S=(f_1(u), \ldots, f_n(u))(n \in N) \quad (11)$$

Here, a probability that the user u succeeds the procedure f with ID u is denoted as p(f⁺(u)|u).

A probability that the user u will succeed through the scenario S is denoted as p(S⁺|u).

Here, a scenario for authentication of the user u is defined in a parallel procedure and a serial procedure, using a probability, as follows.

<Success Probability of Parallel Procedures>

Let the procedure f be all parallel in the scenario S. In the case of parallel procedures, assuming that a success probability of each procedure and other procedure is independent, the probability p(S⁺(u)|u) of success through the scenario S is given by the following equation (12).

$$p(S^+(u)|u)=p(f_1^+(u)|u) \times p(f_2^+(u)|u) \times \ldots \times p(f_n^+(u)|u) \quad (12)$$

When an attacker impersonates the user u to try authentication, the probability p(S⁺(u)|a) of success through the scenario S is expressed by the following equation (13).

$$p(S^+(u)|a)=p(f_1^+(u)|a) \times p(f_2^+(u)|a) \times \ldots \times p(f_n^+(u)|a) \quad (13)$$

<Serial Procedure and Prior Probability>

Scenario S in which serial procedures are combined:

$$S=(f_1(u), \ldots, f_n(u))(n \in N) \quad (14)$$

A probability p(S⁺(u)|u) for the user u to succeed the scenario S is as follows.

In the case of serial procedures, an occurrence probability of an event varies, when a correlation exists, due to a fact that $f_1, \ldots,$ and $f_{i-1}$ have been performed before the procedure $f_i (i \in N)$ is performed. Here, in consideration of a prior probability, the probability p(S⁺(u)|u) is given by the following equation (15).

$$p(S^+(u)|u) = \\ p(f_1^+(u)|u) \times p(f_2^+(u)|uf_1^+(u)) \times p(f_3^+(u)|uf_1^+(u)f_2^+(u)) \times \\ \ldots \times p\left(f_n^+(u) \middle| u \prod_{i=1}^{n-1} f_i^+(u)\right) \quad (15)$$

A probability p(S⁺(u)|a) that an attacker a succeeds in the scenario S of the equation (14) is given by the following equation (16).

$$p(S^+(u)|a) = \\ p(f_1^+(u)|a) \times p(f_2^+(u)|af_1^+(u)) \times p(f_3^+(u)|af_1^+(u)f_2^+(u)) \times \\ \ldots \times p\left(f_n^+(u) \middle| a \prod_{i=1}^{n-1} f_i^+(u)\right) \quad (16)$$

<Probability Calculation of Combination of Parallel Procedure and Serial Procedure>

A probability p(S⁺(u)|a) that the user u succeeds in the scenario S combined with a parallel procedure and a serial procedure is given by the following equation (17).

$$p(S^+(u)|u) = \\ p(f_1^+(u)|u) \times p(f_2^+(u)|uf_1^+(u)) \times p(f_3^+(u)|uf_1^+(u)f_2^+(u)) \times \\ \ldots \times p\left(S_n^+(u)u \prod_{i=1}^{n-1} f_i^+(u)\right) \quad (17)$$

In the equation (17), a parallel probability can be calculated, assuming that there is no prior probability, and can be generalized to a serial procedure.

<Application Example of Multi-Factor Authentication Probability>

Next, an application example of the multi-factor authentication probability in the embodiment will be described.

There are services, such as smartphones, that utilize multiple authentication schemes. An example of application to a technique for continuously and dynamically evaluating such services will be described. In the present embodiment, security parameters and usability parameters used when evaluating services will be described.

It is important to evaluate security in authenticating multiple elements. In authentication, it is desirable that a user u always succeeds for each procedure, and an attacker a does not succeed. In other words, it is desirable that a probability that attacker a will succeed is 0. When attackers $a_1, \ldots$ and $a_n$ are present, a probability that a certain procedure 1 will succeed is desirable to satisfy $$p(S^+(u)|a_i)=0 \quad (18).$$

However, each procedure can not completely set the probability of attacker's success to 0, when releasing a service at a certain time t0. Therefore, security evaluation is required. What is considered as a security evaluation here, is such that security evaluation is set so as not to exceed a security parameter k, when attacks with a low skill level such as a brute force attack are being performed.

Therefore, a service srvc is started, with the security parameter k set as follows.

$$p(S^+(u)|a)<k \quad (19)$$

It can be said that some countermeasure is necessary, when the security evaluation becomes the security parameter k or more as a result of an attacker a making an attack against the user u.

Even if security is high for the user u, usability would not be good with such a mechanism in which input by the user u is always refused. For example, in order to give emphasis on usability alone and to set input of a user to always succeed in each procedure, it is necessary to aim at constructing a system in which the following holds.

$$p(S^+(u)|u)=1 \quad (20)$$

Since it is expected that there is no input that is always constant, such as input errors by a user or input fluctuation in biometric authentication, it is not realistic to construct a system in which user's input is always successful.

Therefore, a service srvc is started with a usability parameter ub set as follows.

$$p(S^+(u)|u) > ub \qquad (21)$$

There is also a need to consider usability regarding whether or not a flow of a scenario S selected is easy to use for the user. For example, regarding the usability parameter ub' of the scenario S itself, the service srvc is started with the usability parameter satisfying a certain level. Thereafter, the usability parameter ub' is regarded as included in the usability parameter ub.

Values of the security parameter k and the usability parameter ub are not necessarily unique. A flexible handling of parameters may be implemented, such as, when transferring a small amount money to an account to which the user have deposited money by bank transfer many times in the past, selecting a higher security parameter k, while selecting a lower security parameter k when transferring a high amount of money to an account number to which the user has never transferred.

In this way, consideration is needed regarding selection of a security parameter k according to a service to be provided, and conversely, regarding provision of a service according to a security parameter k. Similarly, a scenario may be selected depending on the security parameter k, or conversely, a security parameter k may be set according to a scenario.

The usability parameter ub often may modify a service. For example, a system with high security is generally desired, but it is not necessarily appropriate in terms of service to construct an excessive security system. Regarding this issue, consideration is needed to a quality of an entire service by taking into account of security, user's usability, etc., and it is difficult to make a judgment.

Figure 4A:
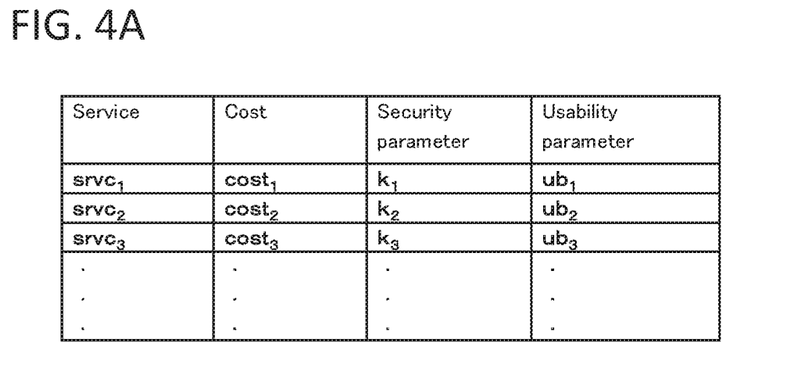
FIG. 4A is a diagram illustrating a relationship between a cost and a security parameter in a table format.

Therefore, as shown in FIG. 4A, it is important to be able to set each parameter for each of services srvc1, srvc2, and srvc3. For each service, a security parameter and a usability parameter are set. A cost column is a cost of each service.

<Update in Multi-Factor Authentication>

Next, updating of values in multi-factor authentication according to the present embodiment will be described.

Safety of each procedure in a scenario is not necessarily as set at a start of a service. There is always a possibility that an attack against each procedure may be proposed, and a system may compromised from improving computer performance, which is different from a setting time (an object is exposed to security risk due to some act or change of situation). Consideration should be also given to lowering of safety caused by abrupt increase of attacks in a certain period, such as frequent attacks on a specific date, for example.

Sometimes it is necessary to suddenly reduce safety of a certain procedure due to popularity of attacks that cannot be found with a system alone. That is, the success probability of each element may be changed (decreased) depending on various factors. On the other hand, services need to be continuously provided. Emphasis on service continuity while implementing countermeasures, rather than stopping the service on a day when an attack occurs, may be needed.

Instead of being forced to a new authentication scheme each time, such flexibility and convenience are important are important for a user, wherein the user can flexibly reconcile with other schemes, and can change to other schemes prepared to some extent, while using a currently used authentication scheme.

Therefore, "update of value" is required to reflect past experiences and predictions, respond to attacks suddenly becoming popular, reflect gradually increasing attacks, etc.

It is assumed that a success probability is continued to be evaluated with a probability of success up to time $t_i$ ($i \in N$, N is a positive integer of 1 or more) evaluated by a success probability up to a certain time $t_{i-1}$. In this case, a value of a success probability $p(S^+_i(u)|a)$ may continue to change as long as a scenario $S_i(i \in N)$ with a service srvc is performed.

Also, it is possible to accurately estimate a risk of a system by continuing to update a frequency of success probability of a user and an attacker accurately, even for an event such as an occurrence of an attack.

Since a system may be managed by a system administrator(s) or the like in providing service, when it is judged that there is an attack, predicting that the probability of success suddenly changes, taking corresponding countermeasures by judging increase of attacks to other users, or taking corresponding countermeasures by judging that a value of p can change suddenly, may be performed.

Especially, it is necessary to take countermeasures if it is predicted that a high-level attack will be performed on the service, or, if some high-level attack on the service are found to be carried out here and there. High level attacks include a password list attack in case of ID password authentication and an attack on biometric authentication including a gummy finger and a wolf attack, for example.

Response to a case where some attacks at time $t_i \in T$ are increased by prediction such as rapid increase of attack at a certain time:

At the time $t_i$, a value of the success probability $p(S^+_i(u)|a)$ decided by an administrator is replaced by a value of a security parameter k' set in advance.

In this case, $p(S^+_i(u)|a)$ of all users are changed. The value of the security parameter k' is not necessarily unique. The value of the security parameter k may be changed to various values depending on an attack level.

A success probability $p(S^+_i(u)|a)$ is not measured only for each user $u_i$, but a value of success probability for a plurality of users is also observed. For each service S, if $p(S^+|a)$ of predetermined j number of users out of users $u \in E$ (U is a set of users) exceeds the security parameter k, $p(S^+|a)$ of other users not included in j number of users may be replaced with the security parameter k'.

It is also expected that service will be attacked due to attacks caused by others such as leakage of password list. When such a prediction is made, a value of $p(S^+_i|a)$ determined by an administrator may be replaced with a value of the preset security parameter k' at a certain time point (time) ti.

<Changes in Multi-Factor Authentication Probability and Scenario Change>

When a success probability $p(S^+|a)$ of an attacker of a scenario S exceeds a security parameter k, it is necessary to change a procedure of the service. In this case, for example, a change of the scenario or a refusal of the service srvc is performed. When the success probability $p(S^+|a)$ exceeds the security parameter k at a certain time t, countermeasures such as changing the scenario S are taken. Below, some countermeasures will be explained. When the service srvc is being provided, the security parameter k is calculated for each scenario. $p(S^+(u_j)|a)$ is an evaluation from a security point of view, and $p(S^+(u_j)|u)$ is an evaluation from a usability point of view.

Figure 4B:
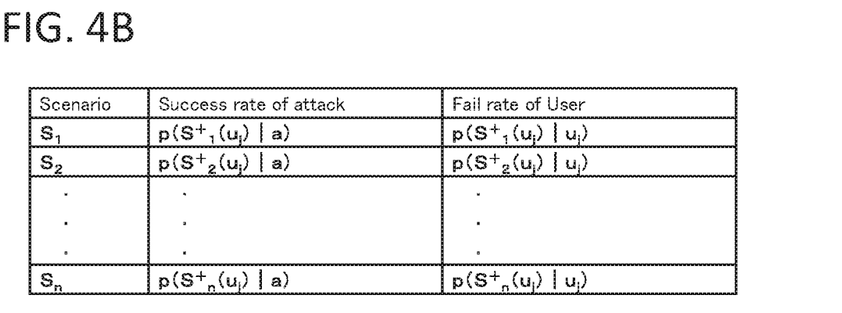
FIG. 4B is a diagram illustrating a relationship between a scenario, an attack probability, and a failure probability of a user in a table format.

As shown in FIG. 4B, not only a success of an attack for each scenario but also an extent to which the user of each scenario fails, etc., are included in an evaluation, thereby making it possible to construct a more easy to use system.

In providing the service to a user $u_j$, the service srvc is started so as to satisfy following conditions:

$$p(S^+(u_j)|a) < k \qquad (22)$$

$$p(S^+(u_j) < ub \qquad (23).$$

When $p(S^+(u_j)|a)$ for user $u_j$ exceeds the security parameter k, in the scenario Si, service provision through the scenario S may be stopped and a service srvc with the scenario S satisfying $p(S^+(u_j)|a) < k$ may be accepted.

When changing a scenario, consideration inclusive of evaluation of usability and impact on the service need to be performed. As to which scenario is to be accepted next, for each scenario S, it is necessary to consider a relationship between user's fail rate and the usability parameter ub, by utilizing FIG. 4 and to present the next scenario. An order of scenarios cannot be evaluated with a value of $p(S^+(u_j)|a)$ alone.

In the present embodiment, there is a case where a completely new scenario is set up after evaluation in each scenario is performed. In providing a service, there is a case where the service itself is changed due to security measures. For example, temporarily lowering the maximum amount of bank transfer, lowering a chargeable amount, etc. In this case, there is a need to select an appropriate service while comparing FIG. 4A with FIG. 4B.

In an entirety of scenarios that the service srvc can take, when $p(S^+|a) > k$, a service provider stops the service srvc. Even when convenience of a user significantly is reduced, the service srvc is stopped, in consideration of the usability ub of the scenario S.

<Operational Effects>

According to the present embodiment, due to widespread use of advanced functions mobile terminals, etc., scenarios for multi-factor authentication can be changed after service is started. A unified mechanism that continuously evaluates multi-factor authentication dynamically can be implemented. As to selection of an authentication scheme, measures such as change of a scenario, i.e., update of a success probability for each scenario, for example, are performed, when security evaluation of authentication alone as determined at the start of the service is inadequate.

<System Configuration Example>

Figure 5:
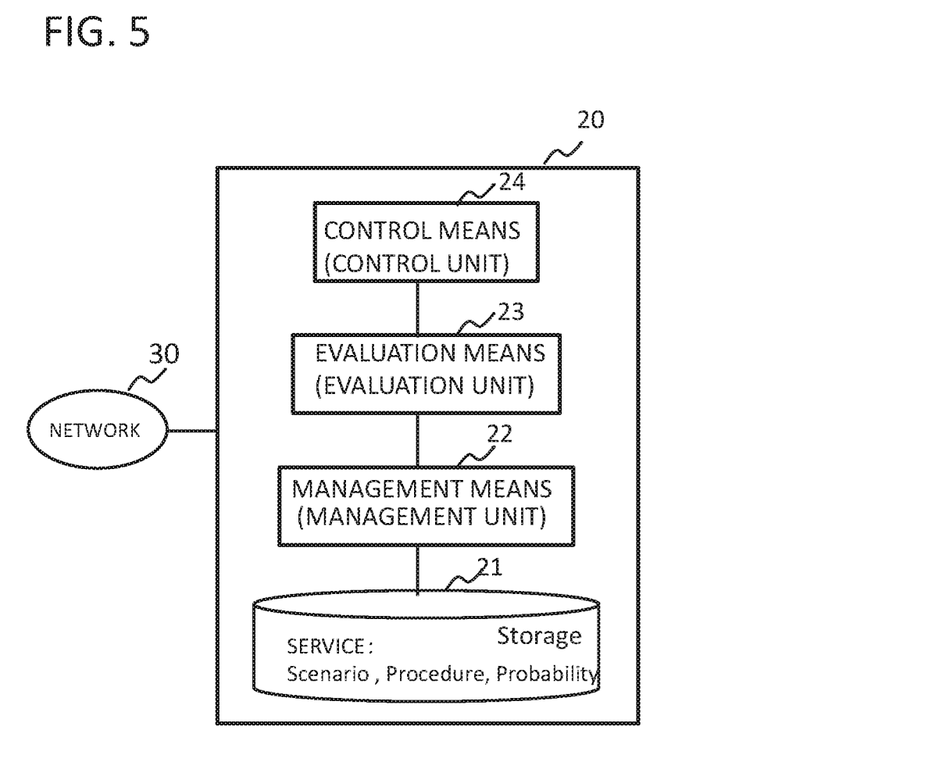
FIG. 5 is a diagram illustrating a configuration example of a system according to an embodiment.

Next, an example of the above-described multi-element authentication system will be described. FIG. 5 is a diagram illustrating an example of a system configuration of the present embodiment. Referring to FIG. 5, the system includes a multi-factor authentication apparatus 20 including a server apparatus or the like connected via a network 30. The network 30 includes, for example, a radio access network, a mobile communication network, an Internet network, and so forth. The multi-factor authentication apparatus 20 composed of a server apparatus may be installed in a server apparatus that provides a service to a client or may be configured as a server apparatus that is different from a server apparatus that provides a service to a client.

The multi-factor authentication apparatus 20 includes a storage unit 21 that stores a scenario S composed of a combination of procedures f of multi-factor authentication required for receiving service provision, in association with the service (see, for example, FIG. 6), and that stores, in correspondence with each procedure f (see FIG. 3B), a probability that a procedure will succeed, an evaluation means (evaluation unit) 23 that calculates a success probability through a scenario S of the service, based on the probability regarding the procedure, and evaluates at least one of security and usability based on the success probability, and a control means (control unit) 24 that controls a service to be provided according to an evaluation result by the evaluation unit 23. Security parameter k and usability parameter ub are stored and managed in the storage unit 21 corresponding to the service (see FIG. 4A). A management unit (management unit) 22 performs update management such as setting, holding, or changing a procedure f corresponding to a scenario stored in the storage unit 21, a probability that the procedure f will succeed, a security parameter k for the service, and the usability parameter ub I do. At least one or all of these means (each unit) may be realized by a program executed by a computer (processor, CPU (Central Processing Unit)) of the server apparatus 20. The program is stored and held in a computer readable memory (for example, a medium such as a semiconductor storage, a magnetic/optical recording medium, etc.).

In the present embodiment, the control means 24 may control start, continuation, or stop of the service based on the evaluation result of the evaluation means 23.

In the present embodiment, the evaluation means 23 evaluates a success probability $p(S^+(u)|u)$ of a user u (user who receives a service) through the scenario S of the service (srvc) and a success probability $p(S^+(u)|a)$ of an attacker a (attacker using the service). The security parameter k to be compared with the success probability $p(S^+(u)|a)$ by the attacker, and the usability parameter ub to be compared with the user's success probability $p(S^+(u)|u)$ are evaluated.

In the present embodiment, the control means 24 starts or continues the service (srvc) through the scenario S, on a condition that the success probability $p(S^+(u)|a)$ by the attacker a through the scenario S of the service (srvc) is less than the security parameter k (equation (22)), and the success probability $p(S^+(u)|u)$ of the user u through the scenario S of the service (srvc) is greater than the usability parameter ub (Expression (23)).

In the present embodiment, when the success probability $p(S^+(u)|a)$ by the attacker a through the scenario S of the service (srvc) exceeds the security parameter k, the control means 24 may stop the service (srvc) through the scenario S, change the scenario S to a scenario S' in which the probability of success by the attacker a is less than the security parameter k, and provide the service (srvc) through the scenario S'.

In the present embodiment, each procedure (f) is expressed as a procedure f which returns 1 when the procedure (f) succeeds and returns 0 when the procedure (f) fails, and the probability includes probability $p(f^+(u)|)$ and $p(f^+(u)|a)$ that each procedure f performed by each of the user u and attacker a succeeds and returns 1.

In the present embodiment, in the evaluation means 23, calculates the success probability of the user through the scenario S of the service (srvc), and the probability of success by the attacker, according to the procedure f constituting the scenario S in parallel connection, serial connection, or a combination thereof (see the above equations (15) to (17)).

Figure 6A:
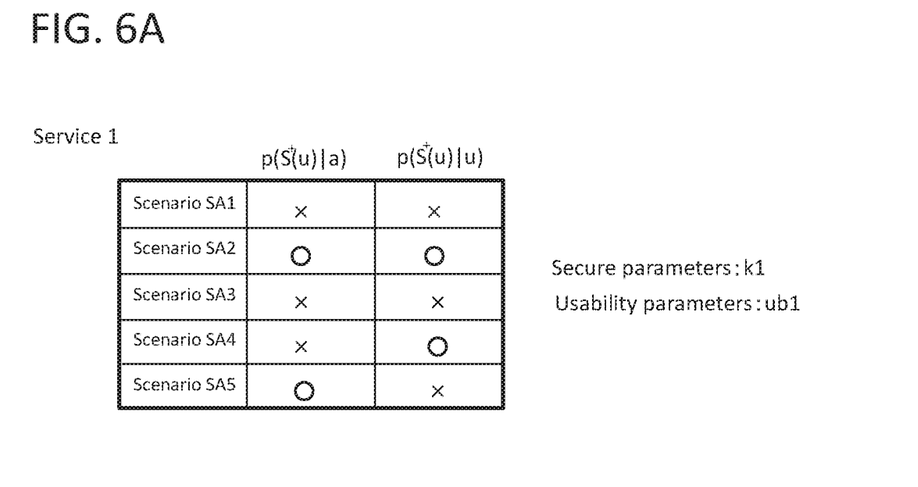
FIG. 6 is a diagram for explaining an example of scenario selection for each service.

FIG. 6 is a diagram for explaining an example of processing of the evaluation means 23 of FIG. 5. In FIG. 6A, in a column of $p(S^+(u)|a)$ for each scenario, a symbol O indicates that the success probability $p(S^+(u)|a)$ by the attacker a through the scenario is less than the security parameter k1 set for the service 1 (Expression (22)) and a symbol x indicates that $p(S^+(u)|a)$ exceeds (is greater than) the security parameter k1. In a column of $p(S^+(u)|u)$, a symbol O indicates that the success probability $p(S^+(u)|u)$ by the user u through the scenario is greater than the usability parameter ub1 set for the service 1 (Expression (23)), and a symbol x indicates that p ($S^+(u)|u$) is less than or equal to the usability parameter ub1.

It is assumed that the service 1 in FIG. 6A includes scenarios A1 to A5. The evaluation means (23/16 of FIG. 5), for each of the scenario A1 to the scenario A5, checks whether or not a condition that the success probability p ($S^+(u)|a$) by the attacker a through the scenario is less than the security parameter k1 and the success probability p ($S^+(u)|u$) of the user u is greater than the usability parameter ub1, is met. In the example of FIG. 6A, only the scenario A2 satisfies the condition. As described above, when the success probability p($S^+(u)|a$) by the attacker a exceeds k, the service provision through the scenario S may be stopped and a service through the scenario A2, and A5, both satisfying p($S^+(u_j)|a$)<k (may be accepted.

Figure 6B:
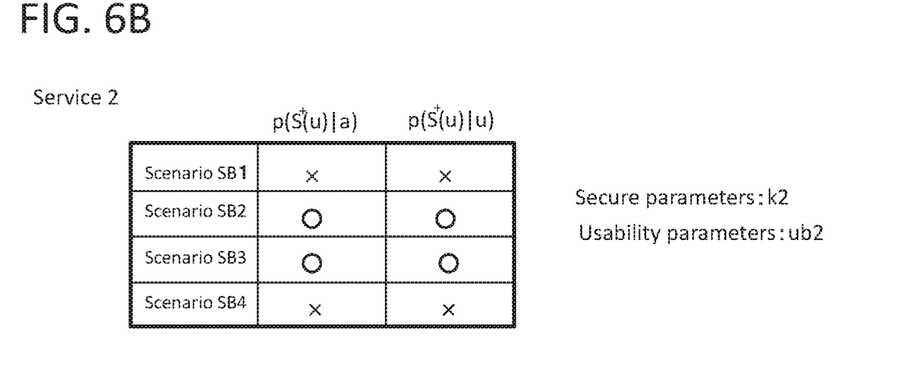

It is assumed that service 2 in FIG. 6B includes scenario B1 to scenario B4, and security parameters k2 and usability parameters ub2 are set for the service 2. The evaluation means (23/16 of FIG. 5), for each of the scenarios B1 to B4, checks whether a condition that the success probability p ($S^+(u)|a$) by the attacker a through the scenario is less than the security parameter k2 and the success probability p ($S^+(u)|u$) of the user u is greater than the usability parameter ub2, is met. In the example of FIG. 6B, only the scenarios B2 and B3 satisfy the condition, and the scenarios B1 and B2 do not satisfy the condition concerning security and usability (equations (22) and (23)).

It should be noted that the example illustrated in FIG. 6 and so forth is only for the sake of explaining an evaluation example of multi-factor authentication, and the present invention as a matter of course is not limited to the example configuration.

Each disclosure of the above-listed Non Patent Literature is incorporated herein by reference. Modification and adjustment of each exemplary embodiment or each example are possible within the scope of the overall disclosure (including the claims) of the present invention and based on the basic technical concept of the present invention. Various combinations and selections of various disclosed elements (including each element in each claim, each element in each example, each element in each drawing, and so on) are possible within the scope of the claims of the present invention. That is, the present invention naturally includes various variations and modifications that could be made by those skilled in the art according to the overall disclosure including the claims and the technical concept.

The above-described embodiments may be annexed, for example, as follows (but not limited thereto).

(Supplementary Note 1)
A multi-factor authentication apparatus communicatively connecting to a terminal to perform multi-factor authentication, comprising:

a storage unit that stores a scenario including a combination of procedures of multi-factor authentication required for the terminal to receive provision of a service in association with the service, and stores, in association with each of the procedures, a probability that the procedure will succeed;

an evaluation means that calculates a success probability of the service through the scenario based on the probability regarding the procedure to evaluate at least one of security and usability based on the success probability; and a control means that controls the service to the terminal, according to the evaluation result.

(Supplementary Note 2)
The multi-factor authentication apparatus according to supplementary note 1, wherein the control means controls start, continuation, or stop of the service to the terminal based on the evaluation result.

(Supplementary Note 3)
The multi-factor authentication apparatus according to supplementary note 1 or 2, wherein the evaluation means calculates a success probability of a user through a scenario of the service and a success probability by an attacker, and evaluates a security parameter to be compared with the success probability by the attacker and a usability parameter to be compared with the success probability of the user, and the control means controls start or continuation of the service to the terminal, on a condition that the success probability by the attacker through the scenario of the service is less than the security parameter, and the success probability of the user through the scenario of the service is greater than the usability parameter.

(Supplementary Note 4)
The multi-factor authentication apparatus according to supplementary note 3, wherein, when the success probability by the attacker through the scenario of the service exceeds the security parameter, the control means stops service provision through the scenario to the terminal, changes to such a scenario that the success probability by the attacker through the scenario of the service is less than the security parameter, and then controls so as to provide the service to the terminal.

(Supplementary Note 5)
The multi-factor authentication apparatus according to any one of supplementary notes 1 to 4, wherein each of the procedures is represented as a procedure f which returns 1 when the procedure is successful and returns 0 when the procedure fails, and the probability includes a probability that the procedure f performed by each of a user and an attacker will succeed and return 1, wherein the evaluation means calculates the success probability of the user through the scenario of the service and the success probability by the attacker in accordance with the procedures constituting the scenario, being arranged in parallel connection, serial connection, or a combination thereof.

(Supplementary Note 6)
The multi-factor authentication apparatus according to any one of supplementary notes 1 to 5, comprising a management means that manages setting, holding, or changing of the procedure for the scenario stored in the storage unit, a probability that the procedure will succeed, and at least one of security and usability for the service.

(Supplementary Note 7)
A server apparatus including the multi-factor authentication apparatus according to any one of supplementary notes 1 to 6.

(Supplementary Note 8)
An authentication system comprising a terminal and a multi-factor authentication apparatus according to any one of supplementary notes 1 to 6.

(Supplementary Note 9)
A multi-factor authentication method comprising:

storing in a storage unit a scenario including a combination of procedures of multi-factor authentication required for a terminal to receive provision of a service in association with the service, and storing in the storage unit, in association with each of the procedures, a probability that the procedure will succeed;

calculating a success probability of the service through the scenario based on the probability regarding the procedure, to evaluate at least one of security and usability based on the success probability; and controlling the service to the terminal, according to the evaluation result.

(Supplementary Note 10)

The multi-factor authentication method according to supplementary note 9, comprising controlling start, continuation, or stop of the service to the terminal based on the evaluation result.

(Supplementary Note 11)

The method according to supplementary note 9 or 10, comprising:

calculating a success probability of a user through a scenario of the service and a success probability by an attacker, and evaluating a security parameter to be compared with the success probability by the attacker and a usability parameter to be compared with the success probability of the user; and controlling start or continuation of the service to the terminal, on a condition that the success probability by the attacker through the scenario of the service is less than the security parameter, and the success probability of the user through the scenario of the service is greater than the usability parameter.

(Supplementary Note 12)

The method according to supplementary note 11, comprising:

when the success probability by the attacker through the scenario of the service exceeds the security parameter, stopping service provision through the scenario to the terminal, changing to such a scenario that the success probability by the attacker through the scenario of the service is less than the security parameter, and then controls so as to provide the service to the terminal.

(Supplementary Note 13)

The method according to any one of supplementary notes 9 to 12, wherein each of the procedures is represented as a procedure f which returns 1 when the procedure is successful and returns 0 when the procedure fails, and the probability includes a probability that the procedure f performed by each of a user and an attacker will succeed and return 1, the method comprising calculating the success probability of the user through the scenario of the service and the success probability by the attacker in accordance with the procedures constituting the scenario, being arranged in parallel connection, serial connection, or a combination thereof.

(Supplementary Note 14)

A program causing a computer communicatively connecting to a terminal to perform multi-factor authentication to execute:

processing of storing in a storage unit a scenario including a combination of procedures of multi-factor authentication required for a terminal to receive provision of a service in association with the service, and storing in the storage unit, in association with each of the procedures, a probability that the procedure will succeed;

evaluation processing of calculating a success probability of the service through the scenario based on the probability regarding the procedure, to evaluate at least one of security and usability based on the success probability; and control processing of controlling the service to the terminal, according to the evaluation result.

(Supplementary Note 15)

The program according to supplementary note 14, wherein the control processing controls, continuation, or stop of the service to the terminal based on the evaluation result.

(Supplementary Note 16)

The program according to supplementary note 14 or 15, wherein the evaluation processing calculates a success probability of a user through a scenario of the service and a success probability by an attacker, and evaluating a security parameter to be compared with the success probability by the attacker and a usability parameter to be compared with the success probability of the user, and the control processing controls start or continuation of the service to the terminal, on a condition that the success probability by the attacker through the scenario of the service is less than the security parameter, and the success probability of the user through the scenario of the service is greater than the usability parameter.

(Supplementary Note 17)

The program according to supplementary note 14, wherein the control processing, changes to such a scenario that the success probability by the attacker through the scenario of the service is less than the security parameter, and then controls so as to provide the service to the terminal, when the success probability by the attacker through the scenario of the service exceeds the security parameter, stops service provision through the scenario to the terminal.

(Supplementary Note 18)

The program according to any one of supplementary notes 14 to 17, wherein each of the procedures is represented as a procedure f which returns 1 when the procedure is successful and returns 0 when the procedure fails, and the probability includes a probability that the procedure f performed by each of a user and an attacker will succeed and return 1, wherein the evaluation processing calculates the success probability of the user through the scenario of the service and the success probability by the attacker in accordance with the procedures constituting the scenario, being arranged in parallel connection, serial connection, or a combination thereof.

(Supplementary Note 19)

The program according to any one of supplementary notes 14 to 18, causing the computer to execute a processing of managing setting, holding, or changing of the procedure for the scenario stored in the storage unit, a probability that the procedure will succeed, and at least one of security and usability for the service.

(Supplementary Note 20)

A non-transitory computer-readable storage medium storing the program of any one of supplementary notes 14 to 19.

The invention claimed is:

1. A multi-factor authentication apparatus comprising:

at least one memory configured to store instructions; and at least one processor configured to execute the instructions to perform:

selecting a security parameter according to a service to be provided to a terminal;

evaluating a first success probability of an attacker through a first scenario including a first combination of procedures of multi-factor authentication;

comparing the first success probability with the security parameter; and based on the first success probability exceeding the security parameter, stopping provision of the service through the first scenario to the terminal, wherein the at least one processor is further configured to execute the instructions to perform:

changing the first scenario to a second scenario including a second combination of procedures of multi-factor authentication so that the first success probability of the attacker through the second scenario becomes lower than the security parameter; and providing the service to the terminal through the second scenario.

2. The multi-factor authentication apparatus according to claim 1, wherein the at least one processor is further configured to execute the instructions to perform:

evaluating a second success probability of a user through the first scenario; and based on the first success probability falling below the security parameter and the second success probability exceeding a predetermined usability parameter, providing the service to the terminal through the first scenario.

3. A multi-factor authentication method comprising:

selecting a security parameter according to a service to be provided to a terminal;

evaluating a first success probability of an attacker through a first scenario including a combination of procedures of multi-factor authentication;

comparing the first success probability with the security parameter; and based on the first success probability exceeding the security parameter, stopping provision of the service through the first scenario to the terminal, wherein the method further comprises:

changing the first scenario to a second scenario including a second combination of procedures of multi-factor authentication so that the first success probability of the attacker through the second scenario becomes lower than the security parameter; and providing the service to the terminal through the second scenario.

4. A non-transitory computer-readable recording medium storing a program, the program causing a computer to perform:

selecting a security parameter according to a service to be provided to a terminal;

evaluating a first success probability of an attacker through a first scenario including a combination of procedures of multi-factor authentication;

comparing the first success probability with the security parameter; and based on the first success probability exceeding the security parameter, stopping provision of the service through the first scenario to the terminal, wherein the program further causes the computer perform:

changing the first scenario to a second scenario including a second combination of procedures of multi-factor authentication so that the first success probability of the attacker through the second scenario becomes lower than the security parameter; and providing the service to the terminal through the second scenario.

* * * * *